April 5, 1927.

R. A. HAGE

COUPLING

Filed Sept. 13, 1924

Inventor
R. A. Hage
By J. W. Fravie
Atty

April 5, 1927.  1,623,110
R. A. HAGE
COUPLING
Filed Sept. 13, 1924  5 Sheets-Sheet 2
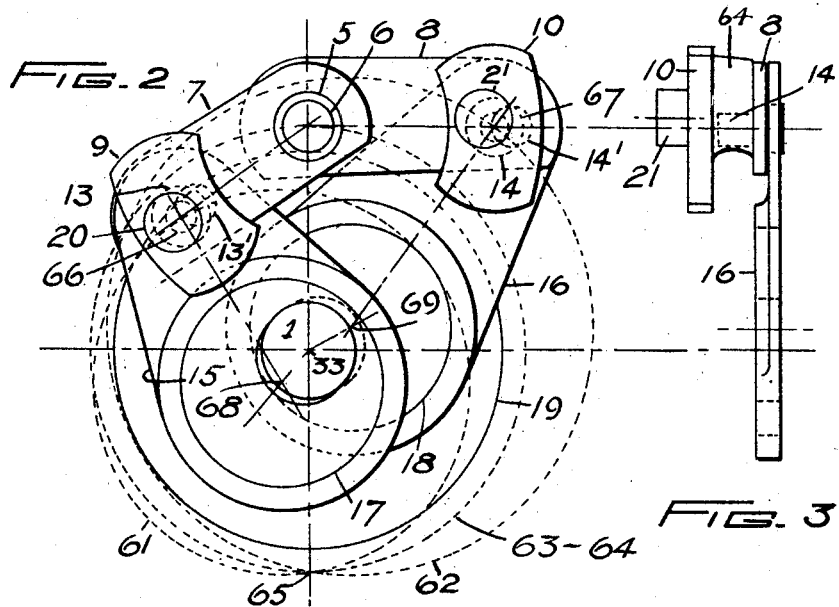
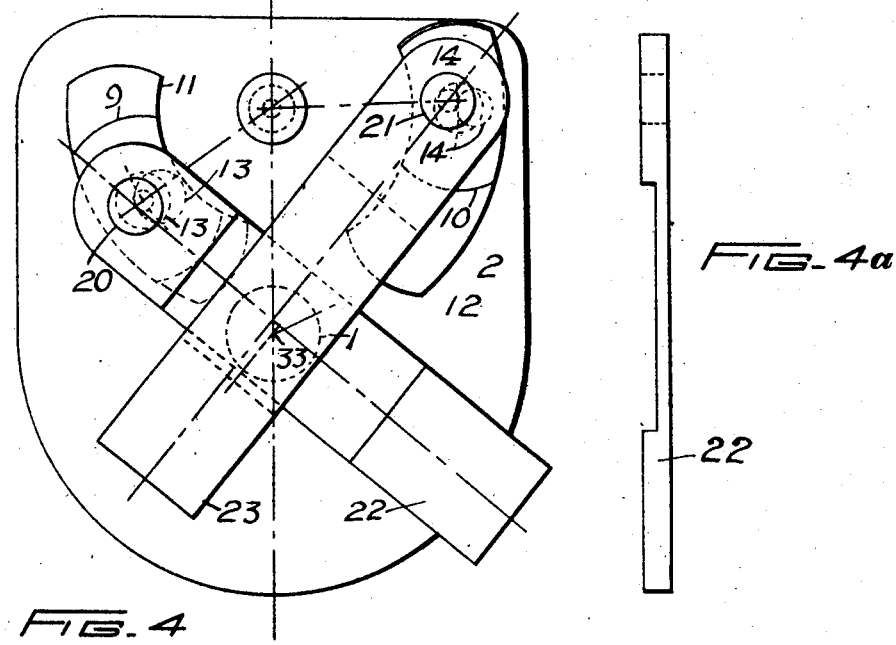
Inventor
R. A. Hage
By Jo. Lowrie
Atty

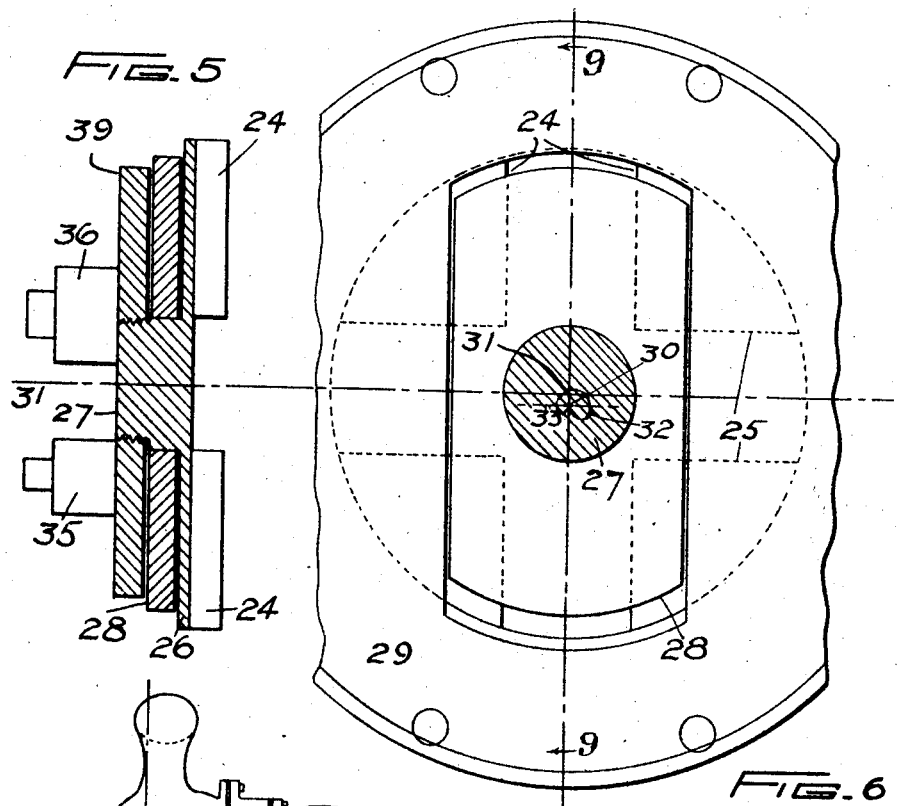
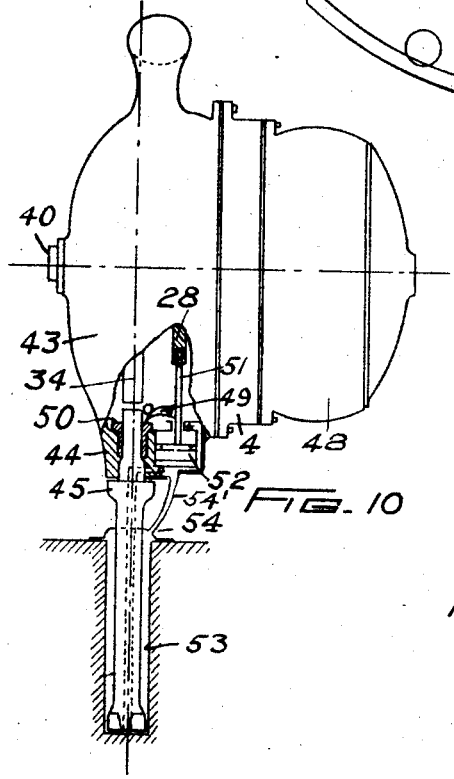
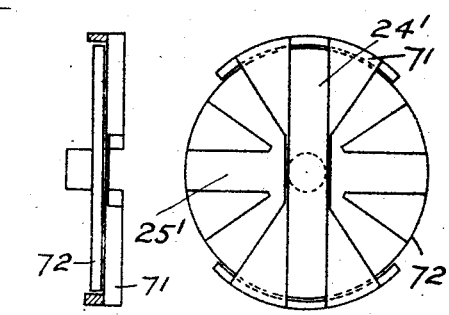

April 5, 1927.  R. A. HAGE  1,623,110
COUPLING
Filed Sept. 13, 1924  5 Sheets-Sheet 4
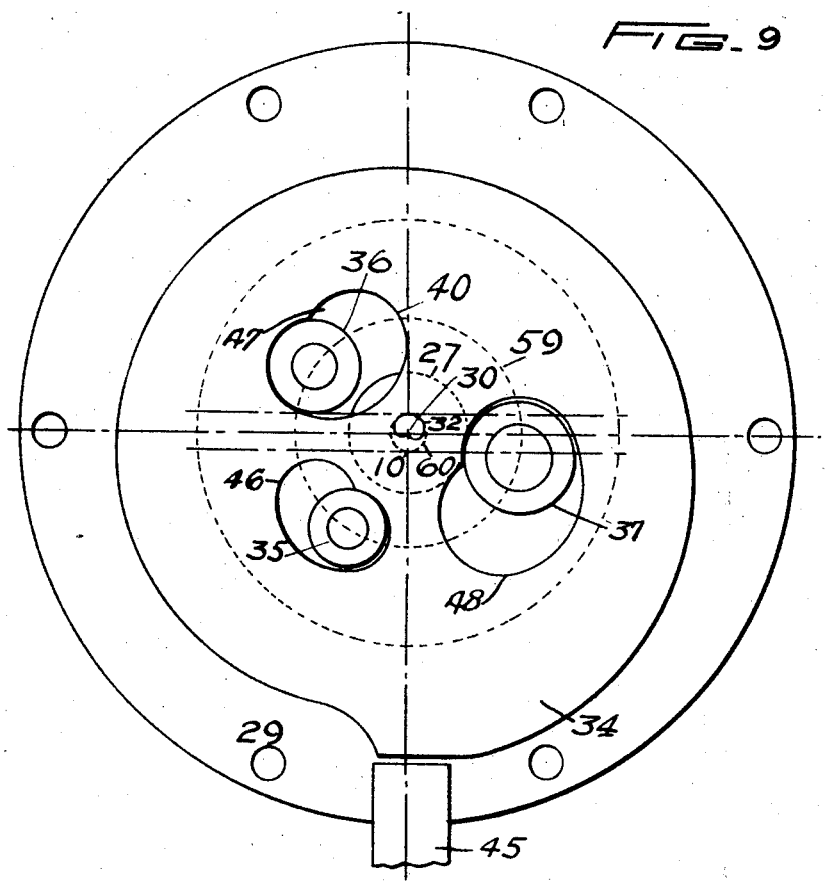
Inventor
R. A. Hage
By Jno Furnie
Atty

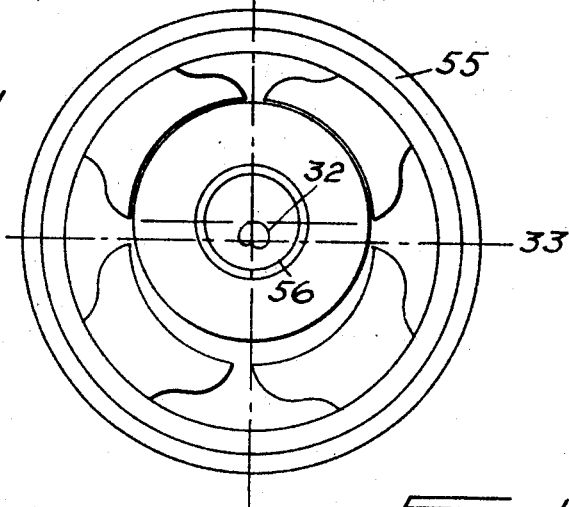
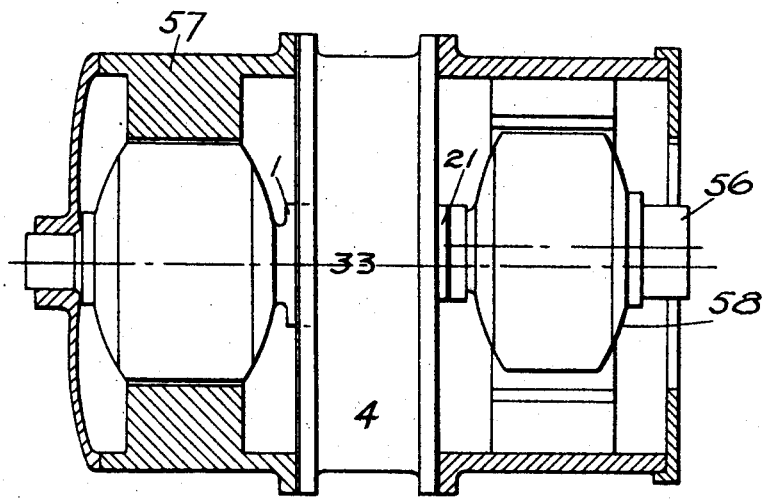

Patented Apr. 5, 1927.

1,623,110

UNITED STATES PATENT OFFICE.

RUDOLF ALEXANDER HAGE, OF GOTTENBORG, SWEDEN.

COUPLING.

Application filed September 13, 1924, Serial No. 737,567, and in Great Britain August 12, 1924.

This invention relates to coupling devices for use in imparting to a hammer disc or other driven member a combined rotary motion and bodily displacement so that its center of gravity traces a closed path. The invention is more particularly applicable to hammer mechanism of the kind described in British Patents Nos. 164,752 and 207,272, but it is not limited to such application.

According to the present invention, a coupling device of this kind is characterized by the incorporation of two sliding members which in addition to being rotated as a whole are caused to reciprocate at right angles to each other by the action of fixed eccentrics. These eccentrics form fixed bearings for a pair of eccentric straps through which pass pivot pins mounted on two arms carried pivotally by a disc mounted on a driving shaft. One end of each of these arms is pivoted on a common pivot pin on the disc and the free ends are connected to shoes moving in curved slots in the disc and are provided with pivot pins which are journalled in the ends of the reciprocating sliding members. The sliding members move in guides formed in a second disc secured to a second shaft adapted to drive a pin disc for operating the hammer disc or other driven member.

The shaft to which the second disc is secured is journalled in a bearing in a slider vertically guided in a guide secured to the casing of the device. The reciprocating movement of this slider may be adapted to effect the periodic rotation of a tool and operate a pump for supplying compressed air to the hole drilled by the tool and for removing dust from said hole.

In the accompanying drawings are illustrated various forms of construction according to the invention.

Fig. 2 is a sectional elevation on the line 2—2 of Fig. 1.

Fig. 3 is a side elevation of one of the eccentric straps, one of the arms, and a shoe.

Fig. 4 is a sectional elevation on the line 4—4 of Fig. 1.

Figure 1:
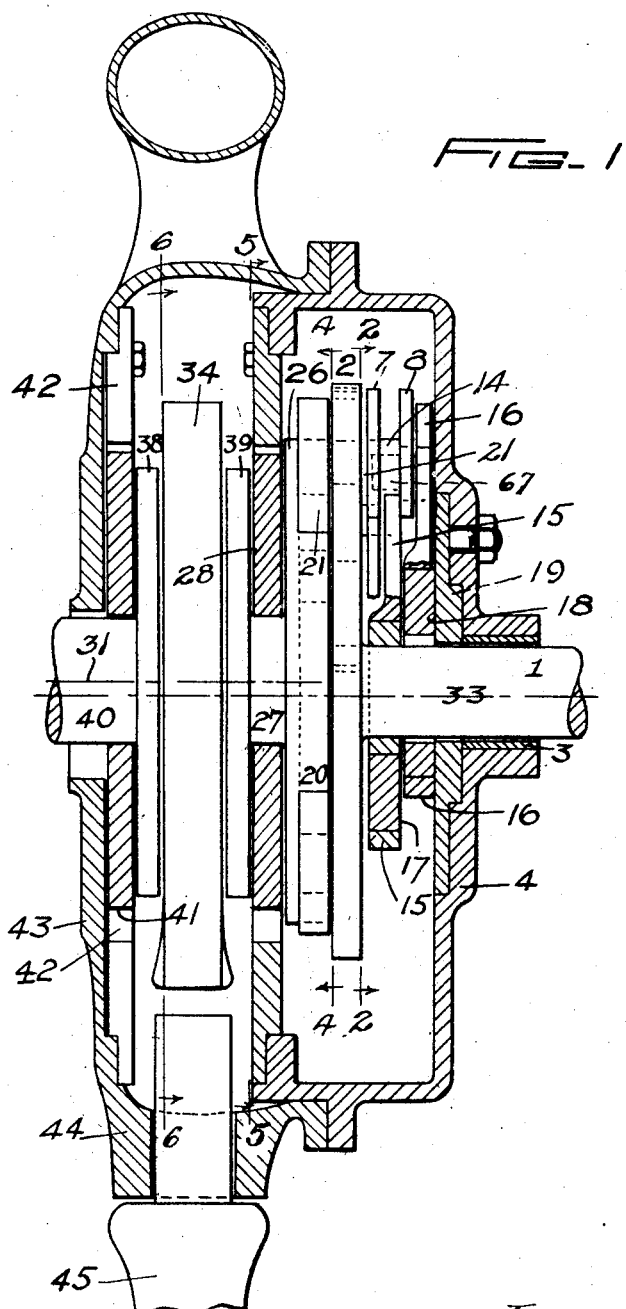
Fig. 1 is a sectional elevation of the coupling device applied to a hammer mechanism.

Fig. 4ª is a detail view of one of the sliding members.

Fig. 5 is a section on the line 5—5 of Fig. 6.

Fig. 6 is a sectional elevation on the line 6—6 of Fig. 1.

Figs. 7 and 8 are side and front elevations of a modified detail.

Fig. 9 is a sectional elevation on the line 9—9 of Fig. 1.

Fig. 10 shows an elevation partly in section of the device applied to a drill and provided with mechanism for periodically rotating a tool and for supplying compressed air to the drill and removing dust from the drilled hole.

Fig. 11 is an elevation of the right hand end of Fig. 12.

Fig. 12 shows the coupling device arranged between an electric motor and an electric generator.

Referring first to the application illustrated in Figs. 1 to 9. The coupling device comprises a disc-like member 2 integral with or attached to a shaft 1 journalled on an axis 33 in a bearing sleeve 3 fitted in a casing 4 and driven by a suitable source of power, such as an electric motor. Two arms 7, 8, are pivotally mounted at one of their ends on a common pivot 5 carried by disc 2 near the upper edge of the rectangular portion of the disc-like member 2, and carry at their other free ends pivot pins 13 and 14 which project from both sides of the arms. The pivot pins 13, 14, projecting from the right hand sides (Fig. 1) of the arms 7, 8, respectively, engage with bearings in the ends of eccentric straps 15, 16, respectively, which ride upon discs 17, 18, eccentrically mounted with respect to the shaft 1 and fixed to a disc 19 bolted to the casing 4. The disc 19 may be adjustable in the casing 4 in order that the positions of the discs 17, 18, may be varied; the discs 17, 18, may also have their positions varied relatively to each other.

The pivot pins 66, 67, projecting from the left-hand side of the arms 7, 8, respectively, carry guide shoes 9, 10, which work in guide slots 11, 12, in the member 2. The shoe 10 is formed with a neck 64, Fig. 3, to allow for the thickness of the arm 7 and its associated eccentric strap 15. The shoes 9, 10, are also provided with pivot pins 20, 21, which engage in bearing holes in sliding members 22, 23, Fig. 4, adapted to slide in grooves 24, 25, Figs. 5 and 6, formed at right angles to one another on the right-hand side (Figs. 1 and 5) of a disc 26. The sliding members 22, 23, are halved in thickness at their central portions as shown in Fig. 4ª in order that both occupy a space equal to the thickness of one.

The disc 26 is secured to a shaft 27, Figs. 1, 5 and 6, which rotates about an axis 31 and is journalled in a bearing in a slider 28, which is guided in a vertical direction by a slotted guide plate 29 bolted to the casing 4.

To the shaft 27 is also secured a disc 39 provided with three pins 35, 36, 37, Figs. 5 and 9, passing through kidney-shaped slots 46, 47, 48, in the hammer disc 34, to another disc 38, Fig. 1, secured to a shaft 40 in alignment with the shaft 27 and journalled in a slider 41 guided in a vertical direction by a slotted guide plate 42 bolted to the casing back 43. The centers of the pins 35, 36, 37, are arranged to lie on a circle 59 described about the centers of the discs 38, 39.

In Fig. 2, the dotted line circle 63 shows the path of the center of the pivot 5, the circle 62, the path of the center of the pivot 67, and the circle 61 the path of the center of the pivot 66. It will be seen that during the rotation of the member 2, a reciprocating motion following the path of the line 69 joining the center of the disc 18 and the center of the pivot 14 is superimposed upon the rotary motion of the pivot 14, which therefore describes and reciprocates along a resultant arc, with respect to the member 2, following the curve of the slot 12.

Similarly a reciprocating motion following the path of the dotted line 68 is superimposed on the rotary motion of the pivot 13, which reciprocates along a resultant arc following the slot 11. A straight line reciprocating motion is thereby imparted to the sliding members 22, 23, through the medium of the pivots 20, 21. The length of the strap 16 will be seen to be greater than that of the strap 15.

By means of this coupling a simultaneous rotary and reciprocating vertical motion is imparted to the shaft 27, the slider 28 reciprocating vertically in its guide plate 29. This motion is transferred to the hammer disc 34 through the medium of the pins 35, 36, 37, Fig. 9, as described in the previously mentioned specifications, the resultant path of the center of gravity of the hammer approximating to the kidney-shaped curve 32, Figs. 6 and 9, and the hammer thereby being raised slowly and lowered relatively quickly.

The duplicated parts 38 to 41 may be dispensed with without affecting the operation of the hammer disc 34.

As illustrated in the modification shown in Figs. 7 and 8, the disc 26 may be replaced by two plates 71, 72, provided with guides 24', 25', and bolted together. The plate 71 is formed with a tip which projects over the edge of the plate 72.

Fig. 10 shows the application of the invention to an electrically operated rock drill, wherein the shaft is driven by an electric motor 48 mounted on the casing 43, the hammer disc 34 coupled to the shaft 40 being driven in the manner described with reference to Figs. 1 to 9. For the purpose of rotating the drill 45 periodically, the slider 28 (see Figs. 1 and 6) is provided with a rod 51 carrying a pivoted pawl 49 engaging with ratchet teeth in a sleeve 50 fitted in the socket 44 and receiving the end of the drill 45. The device is so arranged that as the slider 28 with the rod 51 moves upwardly, the pawl 49 rides freely over the ratchet teeth of the sleeve 50, but during the downward movement of the slider 28 and rod 51, the pawl 49 engages with the teeth of the sleeve 50 and imparts a partial turn thereto. The pawl 49 is held downwardly by any suitable means, such as gravity or a spring or a weight.

The rod 51 is also attached to a piston 52' working in a cylinder 52 so that during the reciprocation of the piston in the cylinder, air is pumped through the central hole of the drill during the downward stroke of the piston, whilst dust is drawn out of the drilled hole 52 during the upward stroke of the piston. For this purpose, the hole is closed in by an air-tight cover 54 and is connected to the pump by a pipe 54'.

Figs. 11 and 12 illustrate the manner in which the previously-described coupling may be used to rotate the armature of an electric generator, the pole pieces of which are not concentric with the armature. An electric motor 57 with concentric pole pieces and armature is directly coupled to a shaft 1 on an axis 33, which drives through a coupling, as previously described, located in the intermediate casing 4, a shaft 21 which is directly connected to the shaft 56 of the armature 58 of a motor generator 55, the armature and pole pieces of which are not concentric. The center of the shaft 56 is thereby caused to move along a re-entrant curve approximating to the curve 32 in order that the point at which the armature is nearest to the pole pieces will move round as the armature rotates.

What I claim is:

1. A coupling device comprising a rotating shaft, a disc-like member mounted on said shaft, two arms mounted on a common pivot on said disc-like member, means for imparting to the free ends of said arms a reciprocatory arcuate motion in addition to their bodily rotary motion with said disc-like member, a second disc mounted in a separate bearing having freedom of movement in a vertical direction, two sliding members which slide in grooves crossing one another at right angles in the face of said second disc, and means for imparting the reciprocatory motion of said free ends of said arms to said sliding members whereby a reciprocatory vertical motion is given to said second disc in addition to a bodily rotary motion.

2. A coupling device comprising a rotating shaft, a disc-like member mounted on said shaft, two arms mounted on a common pivot on said disc-like member, two fixed discs eccentrically mounted with respect to said shaft and carrying straps to which are pivoted respectively the free ends of said two arms whereby a reciprocatory motion in addition to a bodily rotary motion is imparted to said free ends, a second disc mounted in a separate bearing having freedom of movement in a vertical direction, two sliding members which slide in grooves crossing one another at right angles in the face of said second disc, and means for imparting the reciprocatory motion of said free ends of said arms to said sliding members whereby a reciprocatory vertical motion is given to said second disc in addition to a bodily rotary motion.

3. A coupling device comprising a rotating shaft, a disc-like member mounted on said shaft, two arms mounted on a common pivot on said disc-like member, means for imparting to the free ends of said arms a reciprocatory motion in addition to their bodily rotary motion with said disc-like member, guide shoes pivoted to said free ends and adapted to reciprocate in slots in said disc-like member, a second disc, two sliding members pivoted to said shoes and which reciprocate in right-angled grooves in the face of said second disc whereby a reciprocatory vertical movement is given to said second disc in addition to a bodily rotary motion.

4. A coupling device comprising a rotating shaft, a disc-like member mounted on said shaft, two arms mounted on a common pivot on said disc-like member, means for imparting to the free ends of said arms a reciprocatory motion in addition to their bodily rotary motion with said disc-like member, a slider mounted for vertical movement in a fixed slotted guide plate, a second disc journalled in a bearing in said slider, two sliding members which work in right angled grooves in the face of said second disc, means for imparting the reciprocatory motion of said free ends of said arms to said sliding members whereby a reciprocatory vertical motion is given to said second disc in addition to a rotary motion.

In testimony whereof I affix my signature.

RUDOLF ALEXANDER HAGE.